US00RE45669E

(19) United States
(12) Reissued Patent
Paterson et al.

(10) Patent Number: US RE45,669 E
(45) Date of Reissued Patent: Sep. 15, 2015

(54) WATER CLOSET

(75) Inventors: Nicholas W. Paterson, Sheboygan, WI (US); Cecile Thalman-Gomez, Ispra (IT)

(73) Assignee: KOHLER CO., Kohler, WI (US)

(21) Appl. No.: 29/429,793

(22) Filed: Aug. 16, 2012

Related U.S. Patent Documents

Reissue of:
(64) Patent No.: Des. 621,918
Issued: Aug. 17, 2010
Appl. No.: 29/343,895
Filed: Sep. 21, 2009

(51) LOC (10) Cl. ..... 23-02
(52) U.S. Cl.
USPC ..... D23/295
(58) Field of Classification Search
USPC ..... D23/295, 301, 303, 309, 313; 4/300, 4/329, 353, 420
See application file for complete search history.

(56) References Cited

U.S. PATENT DOCUMENTS

| | | | | | |
|---|---|---|---|---|---|
| D299,163 | S | * | 12/1988 | Robinson | D23/274 |
| D494,667 | S | * | 8/2004 | Kergoet | D23/295 |
| D496,444 | S | | 9/2004 | Kergoet | |
| D509,575 | S | * | 9/2005 | Kergoet | D23/295 |
| D559,367 | S | * | 1/2008 | Maruhashi | D23/295 |
| D559,961 | S | * | 1/2008 | Maruhashi | D23/295 |
| D594,945 | S | | 6/2009 | Nakasaki et al. | |
| D603,488 | S | * | 11/2009 | Maruhashi | D23/295 |
| D612,026 | S | * | 3/2010 | Soulier | D23/295 |
| D615,173 | S | * | 5/2010 | Arets | D23/295 |

FOREIGN PATENT DOCUMENTS

| | | |
|---|---|---|
| CN | 02374106.6 | 11/2002 |
| CN | 3302290 | 11/2002 |
| CN | 200630050690.8 | 1/2003 |
| CN | 3376251 | 9/2003 |

(Continued)

OTHER PUBLICATIONS

Hastings Bath Collection, "Verso Toilet and Bidet"; HomePortfolio.com online catalog. Copyright 1997-2007; HomePortfolio.com.

(Continued)

*Primary Examiner* — Phillip S Hyder
(74) *Attorney, Agent, or Firm* — Foley & Lardner LLP

(57) CLAIM

The ornamental design for a water closet, as shown and described.

DESCRIPTION

*The present application is a broadening reissue of U.S. Pat. No. D621,918, which granted on Aug. 17, 2010, based on U.S. patent application Ser. No. 29/343,895, filed Sep. 21, 2009, the entire disclosure of which is incorporated herein by reference.*

FIG. 1 is a right, top, front [perspective] *isometric* view of a water closet embodying our new design;
FIG. 2 is a right side elevational view thereof;
FIG. 3 is a left side elevational view thereof;
FIG. 4 is a front elevational view thereof;
FIG. 5 is a top plan view thereof;
FIG. 6 is bottom plan view thereof; and,
FIG. 7 is a rear elevational view thereof.

The broken line representations in the figures are for the purpose of illustration only, and form no part of the claimed design.

In a preferred embodiment, the nature of this product is a plumbing fixture in the form of a water closet, which is primarily useful for receiving the liquid and solid waste of humans.

1 Claim, 4 Drawing Sheets

Figure 3:
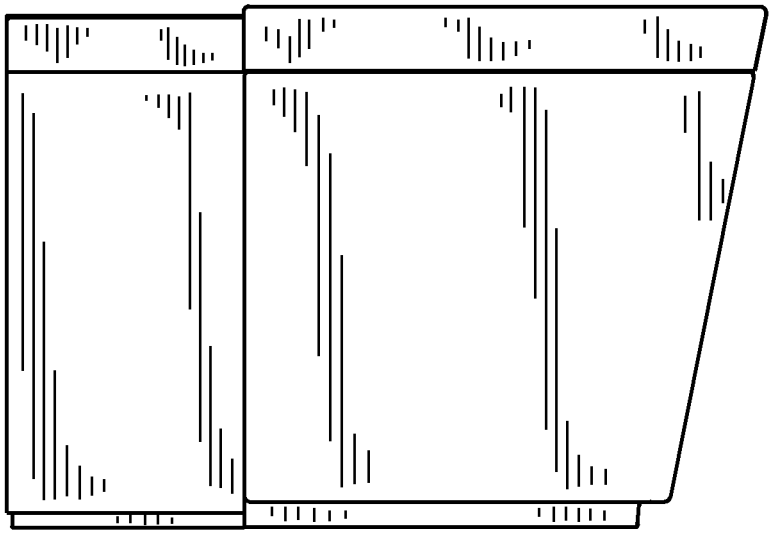
Figure 4:
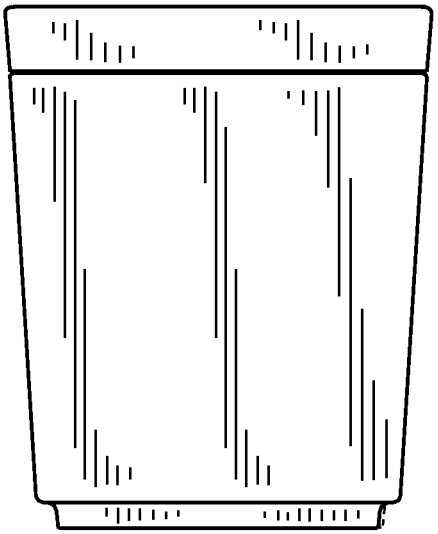
Figure 5:
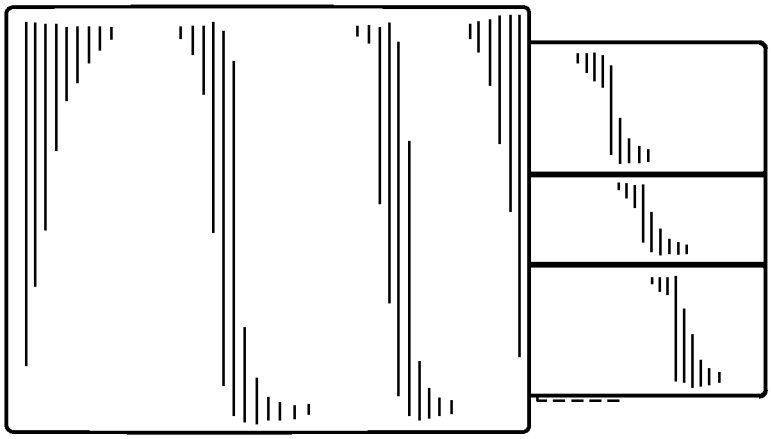
Figure 6:
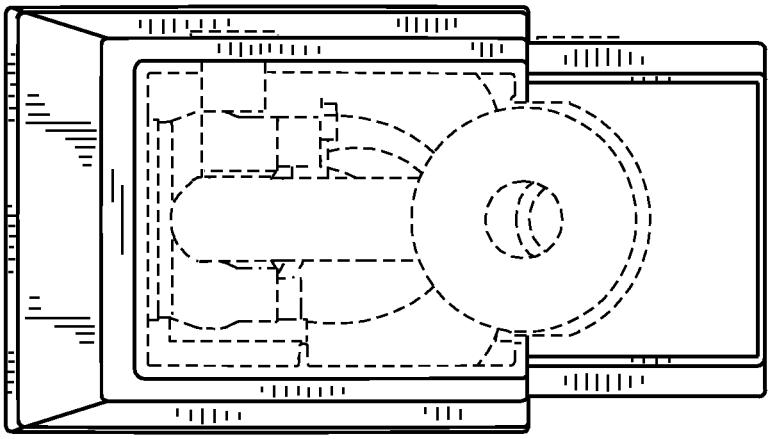
Figure 7:
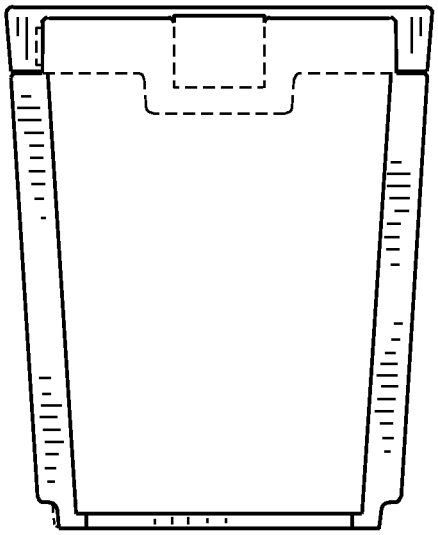

Matter enclosed in heavy brackets [ ] appears in the original patent but forms no part of this reissue; matter printed in italics indicates the additions made by reissue.

(56) References Cited

FOREIGN PATENT DOCUMENTS

| | | |
|---|---|---|
| CN | 3652563 | 4/2006 |
| CN | 300730493 | 12/2006 |
| CN | 300739614 | 4/2007 |
| CN | 300801484 | 7/2007 |
| CN | 200730349563.2 | 11/2007 |
| CN | 300894410 | 2/2008 |
| CN | 300905381 | 3/2008 |
| CN | 300917296 | 3/2008 |
| EM | 000110531-0002 | 4/2004 |
| EM | 00026450-0005 | 2/2005 |
| EM | 000264502-0001 | 2/2005 |
| EM | 000264502-0002 | 2/2005 |
| EM | 000264502-0005 | 2/2005 |
| EM | 000284502-0002 | 2/2005 |
| EM | 000833835-0002 | 1/2008 |
| JP | 843438 | 4/1992 |
| JP | 843438-2 | 4/1992 |
| JP | 843438-3 | 4/1992 |
| JP | 843438-3 | 9/1992 |
| JP | 1283637 | 9/2006 |

OTHER PUBLICATIONS

Kohler Co., "Escale Dual Flush Toilet Tank"; HomePortfolio.com online catalog. Copyright 1997-2007 HomePortfolio.com.

Duravit, "2nd Floor"; Model No. 011009; Duravit.com online catalog. Copyright 2008 Duravit.

* cited by examiner

FIG. 1
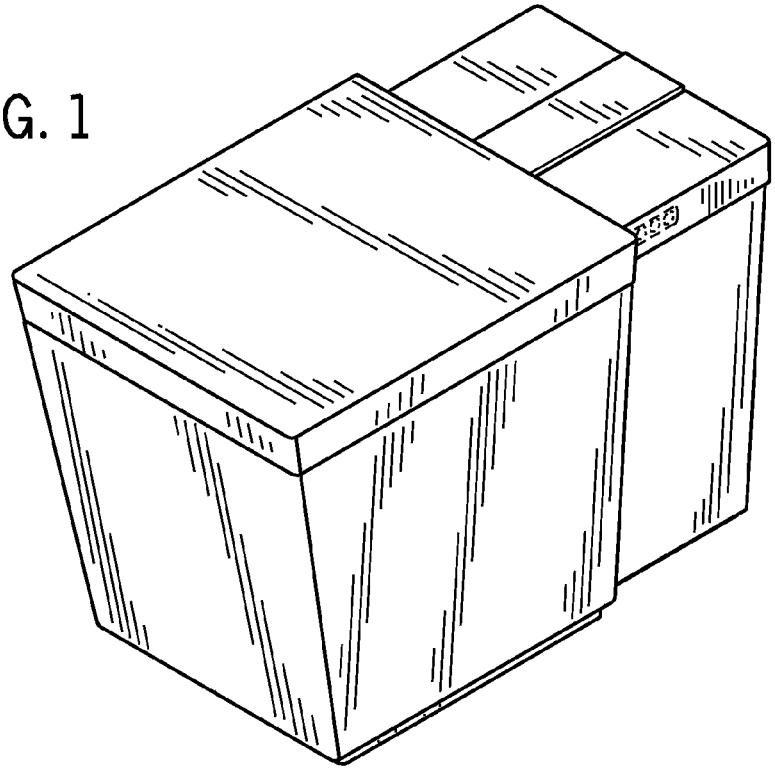
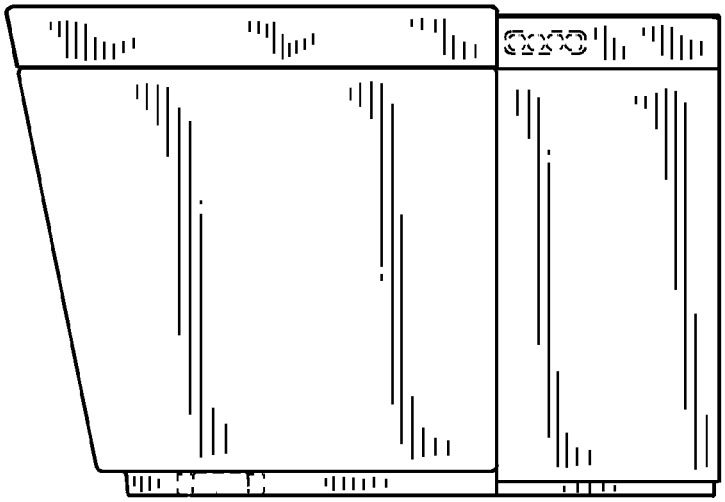
FIG. 2